United States Patent [19]

Crounse et al.

[11] 3,758,575
[45] Sept. 11, 1973

[54] BROMINATION OF SALICYLANILIDE
[75] Inventors: Nathan N. Crounse, Cincinnati; Raymond E. Werner, Wyoming; Harold L. Dimond, Evendale, all of Ohio
[73] Assignee: Sterling Drug Inc., New York, N.Y.
[22] Filed: Oct. 20, 1969
[21] Appl. No.: 867,908

[52] U.S. Cl. .......................................... 260/559 S
[51] Int. Cl. ......................................... C07c 103/20
[58] Field of Search .............................. 260/559 S

[56] References Cited
UNITED STATES PATENTS
3,064,048  11/1962  Schramm et al ................. 260/559 S Primary Examiner—Henry R. Jiles
Assistant Examiner—S. D. Winters
Attorney—Elmer J. Lawson, B. Woodrow Wyatt, Thomas L. Johnson, Robert K. Bair, William G. Webb and Roger T. Wolfe

[57] ABSTRACT

In the process for preparing 3,4',5-tribromosalicylanilide by the interaction of bromine with salicylanilide, the use of an inert reaction medium consisting of chlorobenzene, water and a surface active agent provides 3,4',5-tribromosalicylanilide essentially free of 4',5-dibromosalicylanilide and 2',3,4',5-tetrabromosalicylanilide.

15 Claims, No Drawings

BROMINATION OF SALICYLANILIDE

This invention relates to improved processes for preparing 3,4',5-tribromosalicylanilide, that is the 4-bromoanilide of 3,5-dibromosalicylic acid, by brominating salicylanilide.

The compound, 3,4',5-tribromosalicylanilide (hereinafter called tribromsalan), is known to be a valuable germicide which is particularly adapted for incorporation into soap and detergent compositions. The commonly available commercial grades of tribromsalan are contaminated with significant quantities of at least one, and more often several, other halogenated salicylanilides, for example 3,5-dibromosalicylanilide, 4',5-dibromosalicylanilide (dibromsalan), 2',3,4',5-tetrabromosalicylanilide, 4'-bromosalicylanilide and 5-bromosalicylanilide, which are formed during the bromination process. Until recently, the presence of the halogenated contaminants has been accepted or even deemed desirable because the contaminants also have germicidal properties. However, more recent investigations have indicated that some of the halogenated salicylanilide contaminants, in particular, dibromsalan and the tetrabromosalicylanilide, may have very undesirable skin-photosensitization effects not attributable to tribromsalan per se. A method for preparing tribromsalan essentially free of these two halogenated contaminants is therefore sought by the industry.

Pure tribromsalan can be prepared on a laboratory scale by condensing 4-bromoaniline with 3,5-dibromosalicylic acid; however, this process is too expensive to be conducted on a commercial scale, and methods have been sought to produce the compound in pure form and in good yield by the bromination of salicylanilide. In the search for such methods, a number of solvent systems have previously been proposed for use as inert reaction media for carrying out the bromination of salicylanilide with approximately three equivalents of bromine. The inert reaction media employed in the prior art for the bromination have made it possible to obtain mixtures of bromosalicylanilides wherein 3,4',5-tribromosalicylanilide is the predominant ingredient; that is, the mixtures contain approximately 70 to 99 percent by weight of tribromsalan. However, a major problem in the use of the previously-suggested inert reaction media is that the mixtures of brominated salicylanilides thereby obtained, contain undesirable quantities of 4',5-dibromosalicylanilide and 2',3,4',5-tetrabromosalicylanilide. Although the prior art had earlier indicated that bromination of salicylanilide in certain reaction media, such as a mixture of chlorobenzene, water and ethanol, tends to produce nearly pure tribromsalan, it has subsequently been established, using improved and more sensitive analytical techniques, which have been developed because of the necessity to detect skin-photosensitizing contaminants, that the synthetic methods of the prior art actually produce greater quantities and a greater variety of contaminants than could previously be detected. The high quality tribromsalan required by the more recent standards for this compound is not readily available by methods taught in the prior art.

Accordingly, it is an object of the present invention to provide an economical process for preparing high quality tribromsalan which is essentially free of the undesirable halogenated salicylanilide contaminants, dibromsalan and the tetrabromosalicylanilide, when analyzed according to modern analytical techniques.

In accordance with the above-stated object of this invention, the present invention resides in an improvement in a process wherein salicylanilide is interacted with approximately three equivalents of bromine in an inert reaction medium to produce 3,4',5-tribromosalicylanilide, where said improvement comprises employing as the inert reaction medium a mixture consisting essentially of:

a. chlorobenzene, approximately 3.5 to 7.0 parts by weight;
b. water, approximately 2.5 to 7.5 parts by weight; amd
c. one or a mixture of surface active agents, approximately 0.02 to 1.5 parts by weight for each part by weight of salicylanilide, whereby there is produced substantially pure 3,4',5-tribromosalicylanilide essentially free of 4',5-dibromosalicylanilide and 2',3,4',5-tetrabromosalicylanilide.

The term "inert reaction medium" as used herein means inert under the reaction conditions employed in the processes of this invention.

The term "essentially free" as used herein means that the mixtures of brominated salicylanilides obtained are free of concentrations of 4',5-dibromosalicylanilide and 2',3,4',5-tetrabromosalicylanilide any greater than 0.1 percent each by weight.

The term "substantially pure" as used herein refers to the purity of the 3,4',5-tribromosalicylanilide and is meant to indicate that the mixtures of brominated salicylanilides obtained by the processes of this invention contain no less than 96.0 percent by weight of 3,4-',5-tribromosalicylanilide.

By the term "surface active agent" is meant those substances which possess the ability to change the surface properties, and more particularly, the interfacial properties of the solutions in which they are incorporated. These substances, which generally have both hydrophilic and hydrophobic groups in the molecule, have the property of lowering the surface tension of the solvents in which they are dissolved or of reducing the interfacial tension between two immiscible liquids, even when used in very low concentration. Surface active agents useful in practicing the processes of this invention embrace a large variety of chemical compounds which may be anionic, nonionic or cationic in nature. The surface active agents preferred for use in this invention are well-known and are generally commercially available.

Suitable anionic surface active agents include the alkali metal salts of sulfated fatty alcohols having 8 to 18 carbon atoms, e.g. sodium and potassium salts of sulfated cetyl alcohol, sodium and potassium salts of sulfated coconut fatty alcohols, and the like; esters of sulfated succinic acid, e.g. the sodium salt of the dioctyl ester of sulfated succinic acid; alkali metal salts of sulfated and sulfonated fatty acid alkanolamides having 8 to 18 carbon atoms, e.g. sodium and potassium N-methyl-N-oleyltaurate, sodium and potassium N-methyl-N-lauroyltaurate, sodium and potassium N-lauroyl-2-aminoethyl sulfate, sodium and potassium N-myristoyl-2-aminoethyl sulfate, and the like; alkyl arylsulfonates such as dodecyl and tridecyl benzene sulfonates; and alkali metal salts of sulfonated alkyl diphenyl ethers such as sodium and potassium salts of dodecyl diphenylether disulfonate. Particularly preferred anionic surface active agents are the alkyl arylsulfonates and the sulfonated alkyl diphenyl ethers.

Suitable nonionic surface active agents include alkylamine oxides, e.g. myristyldimethylamine oxide, cetyldimethylamine oxide, lauryldimethylamine oxide, and the like; fatty acid alkanolamides such as lauric monoethanolamide, myristic monoethanolamide, stearic monoethanolamide, lauric diethanolamide, stearic diethanolamide, mixtures of coconut fatty acid mono- and diethanolamides, and the like. Additional suitable nonionic surface active agents include polyethylene oxide derivatives of higher fatty acids such as ricinoleic acid and ethylene oxide condensates of the higher fatty alcohols exemplified by iso-octyl alcohol, nonyl alcohol, decyl alcohol, oleyl alcohol; sorbitan derivatives such as sorbitan monolaurate and sorbitan sesquiolate; alkynols, e.g. dimethyl hexynol and dimethyl octynediol; ethylene glycol mono lower-alkyl ethers, e.g. 2-methoxyethanol, 2-ethoxyethanol, 2-butoxyethanol, and the like; and polyethylene glycols, e.g. those having the general formula $$RO-CH_2(CH_2OCH_2)_nCH_2OH$$

wherein R is hydrogen or methyl and $n$ is an integer such that the average molecular weight of the molecule has a range from 200 to 6,000 when R is hydrogen and from 350 to 750 when R is methyl. Preferred among the nonionic surface active agents are the polyethylene glycols having the above-shown formula wherein the average molecular weight is 200 when R is hydrogen and 350 when R is methyl, and the ethylene glycol mono lower-alkyl ethers, and in particular, 2-ethoxyethanol.

Cationic surface active agents useful in the practice of the methods of this invention are the quaternary ammonium compounds derived from alkylamines having from 1 to 18 carbon atoms in the alkyl chain, e.g., hexyltrimethyl ammonium chloride, dihexyldimethyl ammonium chloride, octyltrimethyl ammonium chloride, dioctyldimethylammonium chloride, distearyl dimethyl ammonium chloride, coconut fatty alkyl dimethyl benzyl ammonium chloride and the like; tertiary amines which are condensation products of ethylene oxide and secondary dialkylamines in which the alkyl chains may be the same or different and contain from 1 to 18 carbon atoms, e.g. N-(2-hydroxyethyl)dimethylamine, N-[(CH$_2$CH$_2$O)$_8$H]-N-propylhexylamine, N-[(CH$_2$CH$_2$O)$_{25}$H]-N-pentadecylhexadecylamine, N-[(CH$_2$CH$_2$O)$_{12}$H]-N-butyldodecylamine, and the like; and tertiary amines which are condensation products of ethylene oxide and primary alkylamines having 1 to 18 carbon atoms in the alkyl chain, e.g. N,N-di(2-hydroxyethyl)methylamine, N,N-di(hydroxyethyl)hexylamine, N,N-di(2-hydroxyethyl)dodecylamine, N,N-di(2-hydroxyethyl)octadecylamine, N-[(CH$_2$CH$_2$O)$_4$H]-N-(2-hydroxyethyl)hexylamine, N,N-di[(CH$_2$CH$_2$O)$_{25}$H]-octadecylamine, and the like. More particularly preferred are the commercially-available condensation products of ethylene oxide with fatty alkylamines, e.g. cocoamine, tallow amine, stearyl amine, and the like. Particularly preferred are the N,N-di(2-hydroxyethyl)fatty alkylamines having an average molecular weight in the approximate range 300 to 400 and especially N,N-di(2-hydroxyethyl)cocoamine having an average molecular weight of approximately 303, prepared by the condensation of approximately two molar proportions of ethylene oxide with a cocoamine which is a mixture of alkylamines having 6 to 18 carbon atoms and consisting of approximately 47 percent dodecylamine, 18 percent tetradecylamine, 9 percent decylamine, 8 percent each of hexylamine and hexadecylamine, and 5 percent each of octadecylamine and octadecenylamine.

It has been determined that tribromsalan of optimum purity is obtained by the processes of this invention when the surface active agent is present in the novel reaction medium in approximately 0.02 to approximately 1.5 parts by weight for each part by weight of salicylanilide to be brominated. Although the use of higher concentrations of surface active agents results in equally satisfactory quality of tribromsalan, the use of concentrations exceeding more than approximately 1.5 parts by weight for each part by weight of salicylanilide is unnecessary and wasteful. A particularly preferred range of concentration of surface active agent is approximately from 0.02 to 0.3 parts by weight for each part by weight of salicylanilide.

The proportions of water and chlorobenzene employed in the reaction medium can vary over a rather wide range. Thus the reaction medium can contain approximately from 3.5 to 7.0 parts by weight of chlorobenzene and from approximately 2.5 to 7.5 parts by weight of water for each part by weight of salicylanilide to be brominated. Stated in terms of percentage composition, the water-chlorobenzene mixture, can contain approximately from 25 to 70 percent by weight of water and approximately from 75 to 30 percent by weight of chlorobenzene. However, the use of a water-chlorobenzene mixture wherein the water content is less than 25 percent by weight tends to give tribromsalan contaminated with more than 0.1 percent each of dibromsalan and tetrabromosalicylanilide. Although the use of more than approximately 70 percent by weight of water in the water-chlorobenzene mixture is not detrimental to obtaining tribromsalan essentially free of the photosensitizing contaminants, it has been found that higher proportions of water substantially lower the rate of bromination. Preferably, approximately equal proportions of water and chlorobenzene by weight are employed and optimum results are achieved when the reaction medium contains approximately 4 to 5 parts by weight of chlorobenzene and approximately 4 to 5 parts by weight of water for each part by weight of salicylanilide. A particularly preferred water-chlorobenzene mixture is one that contains approximately 4.2 parts by weight of water and approximately 4.6 parts by weight of chlorobenzene (approximately 48 percent water) for each part by weight of salicylanilide to be brominated.

The quantity of reaction medium employed in relation tp the charge of salicylanilide to be brominated is not critical and is variable within rather wide limits. Thus, tribromsalan of a high degree of purity and essentially free of dibromsalan and tetrabromosalicylanilide is obtained when salicylanilide comprising approximately from 6 to 15 percent by weight of the reaction mixture is brominated in the novel reaction medium of the instant invention. The particular quantity of reaction medium to be employed is chiefly determined by the need for maintaining efficient agitation of the reaction mixture throughout the reaction period. Since the reaction mixture gradually thickens during the bromination, sufficient reaction medium should be used to maintain agitation at such a rate as to complete the bromination in a reasonable time. When concentrations of salicylanilide higher than 15 percent are employed, the reaction time is substantially increased. Concentrations of less than 6 percent do not result in appreciably shortened reaction time and tend to be uneconomical in the use of the reaction medium. Optimum results are achieved when a concentration of salicylanilide of approximately 10 percent by weight of the initial reaction mixture to be brominated is employed.

The bromination is conveniently conducted by gradually adding the bromine to an efficiently stirred suspension of the salicylanilide in the novel reaction medium of this invention. The exact reaction temperature is not considered to be critical. The addition of the bromine is usually initiated with the reaction mixture at a temperature between 20° C. and 70° C. and is made at such a rate as to permit a gradual rise in the temperature. It is preferred to carry out the addition at a rate such that when all the bromine has been added, the temperature of the reaction mixture is in the range of 45° C. to 80° C. It has been found that the bromination proceeds satisfactorily at temperatures between 45° C. and 90° C. However, it is preferred to keep the reaction mixture at a temperature between 80° C. and 90° C. because in that temperature range the bromination proceeds at a conveniently rapid rate. The tribromsalan is isolated by filtration of the reaction mixture and the collected solid is washed several times with chlorobenzene and then several times with water. The solid is then dried to constant weight.

The prior art teaches that in addition to preparing tribromsalan by employing the theoretical quantity of bromine, that is, approximately three molecular proportions, tribromsalan can also be prepared by employing approximately one-half the theoretical quantity of bromine and sufficient alkali metal chlorate to completely oxidize the hydrogen bromide by-product to bromine. For example, tribromsalan is conveniently prepared by brominating salicylanilide with approximately 1.5 molecular proportions of bromine and at least 0.5 molecular proportions of an alkali metal chlorate, for example, sodium chlorate and potassium chlorate. In either case, the salicylanilide is interacted with approximately three equivalents of bromine; that is, each molecule of salicylanilide is interacted with three atoms of bromine. The novel, inert reaction medium of the present invention is useful not only for the bromination of salicylanilide wherein approximately three molecular proportions of bromine are employed, but it is also useful wherein approximately 1.5 molecular proportions of bromine and alkali metal chlorate are employed.

The analysis of the products prepared by the processes of this invention was carried out by quantitative thin-layer chromatographic (TLC) techniques. The individual products were separated on chromatographic plates, each of which consisted of a glass plate bearing a layer of silica gel of 2.50 micron thickness which had been activated by heating for one-half to 1 hour at 110° C. Two solvent systems were used, one consisting of chloroform-benzene-formic acid (70:28:2) and the other, benzene-formic acid (98:2).

The following examples further illustrate specific embodiments of the invention. All parts are parts by weight and melting points reported herein are uncorrected.

EXAMPLE 1

A mixture of 166 parts of chlorobenzene, 150 parts of water, 59.2 parts of 2-ethoxyethanol, and 42.65 parts (0.2 molecular proportion) of salicylanilide was vigorously stirred and heated to 70° C. Over a period of 100 minutes, 129.6 parts (0.81 molecular proportion) of bromine were added dropwise to the mixture while the temperature was held at 70° C. Stirring and heating were continued for four hours at 70° C. after the addition was complete. The reaction mixture was filtered and the collected solid was washed first with three 100 ml. portions of chlorobenzene, then with 100 ml. of a 20 percent w/v aqueous solution of sodium bisulfite and finally with three 100 ml. portions of water. The solid was air-dried to constant weight to obtain 81.9 parts of product (91.0 percent yield based upon tribromsalan) which melted at 224.1–226.2° C. Thin layer chromatographic analysis showed the white amorphous solid to be 96.8 percent tribromsalan, 1.5 percent 3,5-dibromosalicylanilide, less than 0.1 percent 4',5-dibromosalicylanilide and less than 0.1 percent 2',3,4'-5-tetrabromosalicylanilide.

When 2-ethoxyethanol is replaced by 2-methoxyethanol in the procedure described in Example 1, the tribromsalan having substantially the same purity and melting point as that obtained in Example 1 is obtained.

The following chromatographic analytical techniques were employed in the quantitative determination of 3,4',5-tribromosalicylanilide in the samples and in the identification and estimation of contaminants when present.

Determination of Tribromsalan

Prepare separate standard solutions of tribromsalan and the sample to be analyzed by dissolving 125 mg. each of tribromsalan and the sample in 80:20 methanol-ether sufficient to make 50.0 ml. of solution. Prepare the chromatographic plates according to the method of Stahl [Egon Stahl, "Thin-Layer Chromatography", Academic Press, Inc., New York, 1965], using silica gel (March $GF_{254}$) 250 microns thick, spread on 20 × 20 cm. glass plates and activated for one-half hour at 110° C. Divide the chromatographic plate into two halves by scribing with a pencil. Apply 0.15 ml. of the standard solution to one-half of the plate in the form of a 7 cm. band parallel to and about 2 cm. above the bottom edge of the plate. Apply 0.15 ml. of the sample solution to the other half of the chromatographic plate in the same way. Develop the plate with benzene-formic acid (98:2) until the solvent front reaches the top of the plate (18 cm.). Remove the plate and evaporate the solvent in a stream of warm air. Carefully outline with a sharp needle the tribromsalan bands as visualized under short wave length ultraviolet light. Remove the bands using a vacuum zone extractor [J.S. Matthews et al., J. Chromatography 9, 331 (1962)] and elute each into separate 25 ml. volumetric flasks with 20 ml. of methanol. Add 0.2 ml. of formic acid to each flask and dilute to the mark with methanol. Read the absorbence of each solution at 279 millimicrons against a reagent blank prepared by transferring 0.2 ml. of formic acid to a 25 ml. volumetric flask and diluted to the mark with methanol. Calculate the percentage of tribromsalan in the sample by comparison with the reference standard.

Ordinarily the samples are run in duplicate or triplicate.

Identification and Estimation of Contaminants

Prepare the chromatographic plates as described above and activate the plates by heating for 1 hour at 110° C. Prepare a 1 percent solution of the sample to be tested in 1:9 methanol-benzene. Apply 10 microliters of the sample to the chromatographic plate in the usual manner. Prepare appropriate amount of each reference standard solution and apply to the chromatographic plate either separately or in a mixture. Develop the chromatogram using the solvent system chloroform-benzene-formic acid (70:28:2). By employing this system, the tribromsalan and its various contaminants are efficiently separated. The Rf values (the Rf value is the distance traveled by the individual band divided by the total distance traveled by the solvent front) for the individual products are as follows:

Rf
0.40 Salicylanilide
0.44 4'-Bromosalicylanilide
0.47 5-Tribromosalicylanilide
0.50 4',5-Dibromosalicylanilide
0.54 3,5-Dibromosalicylanilide
0.59 3,4',5-Tribromosalicylanilide (tribromsalan)
0.84 2',3,4'-5-Tetrabromosalicylanilide Evaporate the solvent from the plate in a stream of dry air and locate the bands under ultraviolet light. The fluorescence of the products is greatly enhanced by spraying the plate with 5–10 ml. of diethylamine. By comparison with the standards, identification of each contaminant and estimation of the quantities thereof are easily made.

Example 2

A mixture of 285 parts of chlorobenzene, 15.35 parts of 2-ethoxyethanol, 211 parts of water, and 74.6 parts (0.35 molecular proportion) of salicylanilide was rapidly stirred and heated to 35 to 40° C. The temperature was maintained at 35 to 40° C. while 181.1 parts (1.134 molecular proportions) of bromine were added dropwise to the reaction mixture over a period of three hours. Then during the next 1.5 hours, the temperature was slowly raised to 80° C. and maintained for an additional 3 hours. The temperature was then raised to 90° C. and maintained for 7 hours. Starch-iodide paper indicated the presence of free bromine in the mixture, which was then allowed to cool to about 25° C. The reaction mixture was filtered and the collected solid was washed with three 88 ml. portions of chlorobenzene followed by washing with two 200 ml. portions of water. The solid was air-dried to constant weight to obtain 147.1 parts (93.4 percent yield based upon tribromsalan) of product which melted at 226–228.3° C. The white, amorphous solid contained only traces of 4',5-dibromosalicylanilide and 2',3,4',5-tetrabromosalicylanilide and was found to be substantially 100 percent tribromsalan, as analyzed by thin-layer chromatography.

When 2-butoxyethanol is substituted for 2-ethoxyethanol in the procedure described above, the product obtained has substantially the same melting point and analytical profile as the product obtained in Example 2.

Example 3

A mixture of 222.2 parts of chlorobenzene, 308 parts of water, 15.4 parts of methoxy polyethylene glycol having an average molecular weight of 350, and 56.3 parts (0.266 molecular proportions) of salicylanilide was stirred while over a period of 30 minutes and at an initial temperature of 20° C., a solution of 152.7 parts (0.956 molecular proportion) of bromine in 70.4 parts of chlorobenzene was added in a dropwise manner. The reaction mixture was gradually heated to 80° C. over a period of 2 hours and then held at 80° C. for 1.5 hours. Finally, the temperature was raised to 90° C. during 15 minutes and then held at 90° C. for 8.5 hours. When cooled to room temperature, the reaction mixture was filtered and the collected solid was washed first with 5 250 ml. portions of water, and then 6 portions of chlorobenzene totalling 600 ml. The solid was dried in vacuo at 75° C. for 10 hours to constant weight to obtain 104.6 parts (87.2 percent yield based upon tribromsalan) of product which melted at 226.4–227.0° C. When analyzed by TLC, the product assayed as 99.5 percent tribromsalan containing less than 0.1 percent each of 4',5-dibromosalicylanilide and 2',3,4',5-tetrabromosalicylanilide.

When methoxy ethylene glycol having an average molecular weight of 350 was replaced by polyethylene glycol having an average molecular weight of approximately 200, tribromsalan of 97.5 percent was obtained.

Example 4

A mixture of 1425 parts of chlorobenzene, 76.75 parts of 2-ethoxyethanol, 1055 parts of water and 373 parts (1.75 molecular proportions) of salicylanilide was stirred and heated to 40° C. Over a period of 1.5 hours, with the temperature maintained at approximately 40°C., 470 parts (2.94 molecular proportions) of bromine were added in a dropwise manner to the reaction mixture. When the addition of bromine was complete, 118.25 parts (1.06 molecular proportions) of 32.5 percent hydrochloric acid were added to the reaction mixture. This was followed by the dropwise addition, over a period of 3 hours while maintaining the temperature of the reaction mixture at 40° C., of a solution of 109.65 parts of (1.03 molecular proportions) of sodium chlorate in 215 parts of water. The temperature of the reaction mixture was then slowly increased over a period of 80 minutes to 80° C. and heating at 80° C. with stirring was continued for 10 hours. The reaction mixture was cooled to about 25° C. and filtered. The collected solid was washed with 3 400 ml. portions of chlorobenzene and then with 2 1 liter portions of water. The solid was dried in vacuo at 60° C. to obtain 730.2 parts (92.8 percent yield based upon tribromsalan) of white solid having a melting point of 225.5–228.8° C. Analysis by TLC showed the product to contain less than 0.1 percent each of dibromsalan and tetrabromosalicylanilide and to be 99.8 percent tribromsalan.

Example 5

Over a period of 2 hours, and at an initial temperature of 25° C., 1,082 parts (6.77 molecular proportions) of bromine were added in a dropwise manner to a rapidly stirred mixture of 2,126 parts of chlorobenzene, 1,950 parts of water, 10.92 parts of N,N-di(2-hydroxyethyl)-cocoamine having an average molecular weight of 303, and 465.6 parts (2.18 molecular proportions) of salicylanilide. At the finish of the addition, the reaction mixture was heated at 90° C. for 6 hours. An additional 20 parts of bromine were added to the reaction mixture followed by heating at 90° C. for an additional 16 hours. The solid present in the reaction mixture was allowed to settle and at 70° C. the supernatent liquid was decanted. The residual solid was treated with a sufficient quantity of 25 percent aqueous solution of sodium metabisulfite to discharge any unreacted bromine and then washed first with chlorobenzene and then with hot water until the water wash was acid-free. The solid was air-dried to constant weight to obtain 800 parts (81.4 percent yield based upon tribromsalan) of white solid which melted at 226.7 to 227.0° C. Analysis by TLC showed this material to be substantially 100 percent tribromsalan containing only traces of 4′,5-dibromosalicylanilide and 2′,3,4′,5-tetrabromosalicylanilide.

Example 6

A procedure similar to that of Example 5 was followed in interacting 42.7 parts (0.2 molecular proportion) of salicylanilide with 100 parts (0.625 molecular proportion) of bromine in a mixture of 222.2 parts of chlorobenzene, 308 parts of water and one part of N,N-di(2-hydroxyethyl)cocoamine having an average molecular weight of 303. This procedure was modified by employing a shorter heating period. The reaction was heated for 2 hours at 80° C. and then for 4.25 hours at 90° C. The product was obtained as a white amorphous solid (89.1 percent yield based upon tribromsalan) melting at 225.6–227.3° C. Analysis by TLC indicated the material to be 99.3 percent tribromsalan containing less than 0.1 percent each of 4′,5-dibromsalan and 2′,-3,4′,5-tetrabromosalicylanilide.

Example 7

Employing a procedure similar to that described in Example 5 hereinabove, 960 parts (4.5 molecular proportions) of salicylanilide were interacted with 2,226 parts (13.9 molecular proportions) of bromine in a mixture of 4,383 parts of chlorobenzene, 22.5 parts of N,N-di(2-hydroxyethyl)cocoamine, and 4,020 parts of water. The reaction mixture was heated first at 80° C. for 2.5 hours, and then at 90° C. for 10 hours. The reaction mixture was then cooled to 20° C. and 900 parts of a 50 percent aqueous solution of sodium metabisulfite was added. Stirring was continued for 30 minutes and then to the reaction mixture there were added 500 parts of a 20 percent aqueous sodium hydroxide solution. After stirring for an additional 30 minutes, the charge was filtered and the collected solid washed, first with 3,333 parts of chlorobenzene, and then with water until acid-free. The solid was air-dried to constant weight to obtain 1,875 parts (92.6 percent yield based upon tribromsalan) of white solid melting at 224.6 to 226.8° C. Thin-layer chromatographic analysis showed the material to be 98.7 percent tribromsalan containing less than 0.1 percent each of 4′,5-dibromosalicylanilide and 2′,3,4′,5-tetrabromosalicylanilide.

Example 8

A mixture of 792 parts of chlorobenzene, 604 parts of water, 160 parts (0.75 molecular proportion) of salicylanilide, and 3.7 parts of dimethyl hexynol was vigorously stirred at an initial temperature of 25° C. while, over a period of 2.5 hours, 382 parts (2.45 molecular proportions) of bromine were added dropwise. After the addition, the reaction mixture was heated at 80° C. for 2.5 hours, then at 90° C. for 5 hours, and then set aside at room temperature overnight. An additional 10 parts of bromine were added and the reaction mixture heated at 90° C. for 5 hours. The reaction mixture was allowed to cool to 65° C. without stirring and the supernatent liquid decanted. The residual solid was treated with a 25 percent aqueous sodium metabisulfite solution in an amount to discharge any unreacted bromine. The mixture was then filtered and the collected solid was washed first with 500 parts of chlorobenzene and then with hot water until the aqueous wash was acid free. The solid was air-dried to constant weight to obtain 302 parts (89.5 yield based upon tribromsalan) of white solid melting at 225.7–227.7° C. The product assayed by TLC proved to be substantially 100 percent tribromsalan containing only traces of 4′,5-dibromosalicylanilide and 2′,3,4′,5-tetrabromosalicylanilide.

Example 9

A mixture of 222.2 parts of chlorobenzene, 308 parts of water, 42.7 parts (0.2 molecular proportion) of N,N-di(2-hydroxyethyl)-salicylanilide, and 1.5 part of N,N-di(2-hydroxyethyl)-cocoamine was stirred while, over a period of 30 minutes, a solution of 50 parts (0.31 proportional parts) of bromine in 70 parts of chlorobenzene was added in a dropwise manner. The reaction mixture was then gradually heated to 50° C. over a period of 30 minutes and there were added 19.8 parts of concentrated hydrochloric acid. This was followed by the addition, in small amounts, of 19.8 parts of sodium chlorate. The temperature of the reaction mixture was then raised to 80° C. After 2 hours the temperature was raised to 90° C. and heating continued for 7 hours. When cooled to room temperature, the reaction mixture was filtered and the collected solid was washed first with chlorobenzene and then with water until the water wash was free of acid. The solid was air-dried to constant weight to obtain 56.8 parts (63.2 percent yield based upon tribromsalan) of material melting at 225.0 to 226.1° C. Analysis by TLC indicated that the shite solid thus obtained, consisted of 99.5 percent tribromsalan and contained less than 0.1 percent of each of 4′,5-dibromosalicylanilide and 2′,3,4′,5-tetrabromosalicylanilide.

Example 10

Following the procedure described in Example 5 hereinabove, but substituting an equivalent amount of sorbitan monolaurate for the N,N-di(2-hydroxyethyl)-cocoamine used in that example, the product obtained (89.8 percent yield based upon tribromosalan) was a white amorphous solid melting at 225.6 to 227.7° C. and was found by TLC analysis to be 98.8 percent tribromsalan containing less than 0.1 percent of 4′,5-dibromosalicylanilide and less than 0.1 percent of 2′,3,-4′,5-tetrabromosalicylanilide.

Example 11

To a stirred mixture of 294 parts of chlorobenzene, 294 parts of water, 12 parts of 2-ethoxyethanol, one part of N,N-di(2-hydroxyethyl)cocoamine, and 42.7 parts (0.2 molecular proportion) of salicylanilide there were added in a dropwise manner over a period of 20 minutes at an initial temperature of 25° C., 100 parts (0.625 molecular proportion) of bromine. The reaction mixture was gradually heated to 90° C. over a 30 minute period and held at 90° C. for 6 hours. When cooled to 20° C., the mixture was filtered and the collected solid washed with chlorobenzene and then with water until the water wash was acid-free. The solid was air-dried to obtain 81.8 parts (90.9 percent yield based upon tribromsalan) of product melting at 226–227.7° C. Thin-layer chromatographic analysis showed the material to be tribromsalan of approximately 97.2 percent purity and containing less than 0.1 percent each of 4',5-dibromosalicylanilide and 2',3,4',5-tetrabromosalicylanilide.

Example 12

Following the procedure described in Example 5 hereinabove, but substituting an equivalent amount of an alkyl arylsulfonate (Atlas G-3300, Atlas Chemical Industries, Inc.) for the N,N-di(2-hydroxyethyl)cocoamine used in that example, the product obtained (93.3 percent yield based upon tribromsalan) melted at 226 to 228° C. and was found by TLC analysis to be 98.3 percent tribromsalan containing less than 0.1 percent each of 4',5-dibromosalicylanilide and 2',3,4',5-tetrabromosalicylanilide.

Example 13

When the procedure described in Example 12 above is followed employing sodium cetylsulfate as the surface active agent in place of the alkyl arylsulfonate used in that example, the 3,4',5-tribromsalicylanilide obtained has substantially the same melting point and analytical profile as the product obtained in Example 12.

Example 14

When the procedure described in Example 10 above is followed employing dioctyl sodium sulfosuccinate as the surface active agent in place of sorbitan monolaurate used in that example, the 3,4',5-tribromsalicylanilide obtained has substantially the same melting point and analytical profile as the product obtained in Example 10.

Example 15

Following the procedure described in Example 9 hereinabove, but replacing the N,N-di(2-hydroxyethyl)cocoamine used as the surface active agent in that example with sodium N-methyl-N-oleyltaurate, there is obtained tribromsalan having substantially the same purity and melting point as the tribromsalan obtained in Example 9.

Example 16

Proceeding in a manner similar to that described in Example 11 hereinabove but substituting an equivalent mixture of 2-ethoxyethanol and potassium N-lauroyl-2-aminoethyl sulfate for the mixture of 2-ethoxyethanol and N,N-di(2-hydroxyethyl)cocoamine used as the surface active agent in that example, there is obtained substantially pure 3,4',5-tribromsalicylanilide which is essentially free of 4',5-dibromosalicylanilide and 2',3,-4',5-tetra-bromosalicylanilide.

Example 17

When the procedure described in Example 12 above is followed employing sodium straight-chain tridecyl-benzene sulfonate as the surface active agent in place of the Atlas G-3300 used in that example, the 3,4',5-tribromsalicylanilide obtained has substantially the same melting point and analytical profile as the product obtained in Example 12.

Example 18

Proceeding in a manner similar to that described in Example 9 hereinabove but substituting sodium dodecyl diphenylether disulfonate for the N,N-di(2-hydroxyethyl)cocoamine used as the surface active agent in that example, there is obtained substantially pure 3,4',5-tribromsalicylanilide which is essentially free of 4',5-dibromosalicylanilide and 2',3,4',5-tetrabromosalicylanilide.

Example 19

Following the procedure described in Example 1 hereinabove, but replacing the 2-ethoxyethanol used as the surface active agent in that example with cetyldimethylamine oxide, there is obtained tribromsalan having substantially the same purity and melting point as the tribromsalan obtained in Example 1.

Example 20

When the procedure described in Example 3 above is followed employing stearic diethanolamide as the surface active agent in place of the methoxy polyethylene glycol having an average molecular weight of 350 used in that example, the 3,4',5-tribromosalicylanilide obtained has substantially the same melting point and analytical profile as the product obtained in Example 3.

Example 21

Proceeding in a manner similar to that described in Example 4 hereinabove but substituting polyoxyethylene palmitate for the 2-ethoxyethanol used as the surface active agent in that example, there is obtained substantially pure 3,4',5-tribromosalicylanilide which is essentially free of 4',5-dibromosalicylanilide and 2',3,-4',5-tetrabromosalicylanilide.

Example 22

Following the procedure described in Example 6 hereinabove, but replacing the N,N-di(2-hydroxyethyl)cocoamine used as the surface active agent in that example with ethoxylated oleyl alcohol there is obtained tribromsalan having substantially the same purity and melting point as the tribromsalan obtained in Example 6.

Example 23

When the procedure described in Example 11 above is followed employing an equivalent mixture of N,N-di(2-hydroxyethyl)cocoamine and distearyl dimethyl ammonium chloride as the surface active agent in place of the mixture of 2-ethoxyethanol and N,N-di(2-hydroxyethyl)cocoamine used in that example, the 3,4',5-tribromsalicylanilide obtained has substantially the same melting point and analytical profile as the product obtained in Example 11.

Example 24

Following the procedure and using the same quantities described in Example 4 hereinabove, but additionally adding to the initial reaction mixture as part of the reaction medium 4 parts of a mixture of acetylenic glycol 2,4,7,9-tetramethyl-5-decyne-4,7-diol and an alkyl phenyl ether of polyethylene glycol in ethylene glycol (Surfynol TG, Airco Chemical) there was obtained 729 parts of white solid (92.6 percent yield based upon tribromsalan) melting at 226.1° C. to 228° C., which was found by TLC analysis to be 99.5 percent tribromsalan containing less than 0.1 percent each of 4',5-dibromosalicylanilide and 2',3,4',5-tetrabromosalicylanilide.

Example 25

When the procedure described in Example 2 above is followed employing N-(2-hydroxyethyl)dimethylamine as the surface active agent in place of 2-ethoxyethanol used in that example, the 3,4',5-tribromsalicylanilide obtained has substantially the same melting point and analytical profile as the product obtained in Example 2.

Example 26

Proceeding in a manner similar to that described in Example 2 hereinabove but substituting N-[(CH₂CH₂O)₈H]-N-propylhexylamine for the 2-ethoxyethanol used as the surface active agent in that example, there is obtained substantially pure 3,4',5-tribromsalicylanilide which is essentially free of 4',5-dibromosalicylanilide and 2',3,4',5-tetrabromosalicylanilide.

Example 27

Following the procedure described in Example 4 hereinabove, but replacing 2-ethoxyethanol used as the surface active agent in that example with N-[(CH₂CH₂O)₁₂H]N-butyldodecylamine there is obtained tribromsalan having substantially the same purity and melting point as the tribromsalan obtained in Example 4.

Example 28

Following the procedure described in Example 2 hereinabove, but replacing 2-ethoxyethanol used as the surface active agent in that example with N,N-di(2-hydroxyethyl)methylamine there is obtained tribromsalan having substantially the same purity and melting point as the tribromsalan obtained in Example 2.

Example 29

Following the procedure described in Example 4 hereinabove, but replacing 2-ethoxyethanol used as the surface active agent in that example with N,N-di(2-hydroxyethyl)hexylamine there is obtained tribromsalan having substantially the same purity and melting point as the tribromsalan obtained in Example 4.

Example 30

Proceeding in a manner similar to that described in Example 2 hereinabove but substituting N,N-di[(CH₂CH₂O)₂₅H]octadecylamine for the 2-ethoxyethanol used as the surface active agent in that example, there is obtained substantially pure 3,4',5-tribromosalicylanilide which is essentially free of 4',5-dibromosalicylanilide and 2',3,4',5-tetrabromosalicylanilide.

We claim:

1. In a process wherein salicylanilide is interacted with approximately three equivalents of bromine in an inert reaction medium to produce 3,4',5-tribromosalicylanilide, the improvement which comprises employing as the inert reaction medium a mixture consisting esssentially of:
   a. chlorobenzene, approximately 3.5 to 7.0 parts by weight;
   b. water, approximately 2.5 to 7.5 parts by weight; and
   c. one or a mixture of surface active agents, approximately 0.02 to 1.5 parts by weight for each part by weight of salicylanilide whereby there is produced a mixture of brominated salicylanilide which contains no less than 96.0 percent by weight of 3,4',5-tribromosalicylanilide and is free of concentrations of 4',5-dibromosalicylanilide and 2',3,4',5-tetrabromosalicylanilide any greater than 0.1 percent each by weight.

2. The process according to claim 1 wherein the surface active agent is anionic.

3. The process according to claim 2 wherein the surface active agent is an alkyl arylsulfonate.

4. The process according to claim 3 wherein the inert reaction medium is a mixture consisting essentially of:
   a. chlorobenzene, approximately 4 to 5 parts by weight;
   b. water, approximately 4 to 5 parts by weight, and
   c. an alkyl arylsulfonate selected from the group consisting of dodecyl benzene sulfonate and tridecyl benzene sulfonate, approximately 0.02 to 0.3 parts by weight for each part by weight of salicylanilide.

5. The process according to claim 2 wherein the surface active agent is an alkali metal salt of a sulfonated alkyl diphenyl ether.

6. The process according to claim 5 wherein the inert reaction medium is a mixture consisting essentially of:
   a. chlorobenzene, approximately 4 to 5 parts by weight;
   b. water, approximately 4 to 5 parts by weight; and
   c. an alkali metal salt of dodecyl diphenylether disulfonate, approximately 0.02 to 0.3 parts by weight for each part by weight of salicylanilide.

7. The process according to claim 1 wherein the surface active agent is nonionic.

8. The process according to claim 7 wherein the surface active agent is an ethylene glycol mono lower alkyl ether.

9. The process according to claim 8 wherein the inert reaction medium is a mixture consisting essentially of:
   a. chlorobenzene, approximately 4 to 5 parts by weight;
   b. water, approximately 4 to 5 parts by weight; and
   c. 2-ethoxyethanol, approximately 0.02 to 0.3 parts by weight for each part by weight of salicylanilide.

10. The process according to claim 7 wherein the surface active agent is a polyethylene glycol.

11. The process according to claim 10 wherein the inert reaction medium is a mixture consisting essentially of:
   a. chlorobenzene, approximately 4 to 5 parts by weight;
   b. water, approximately 4 to 5 parts by weight, and
   c. a polyethylene glycol selected from the group having the general formula $$RO-CH_2(CH_2OCH_2)_nCH_2OH$$

wherein R is hydrogen or methyl and $n$ is an integer such that the average molecular weight is 200 when R is hydrogen and 350 when R is methyl, approximately 0.02 to 0.3 parts by weight
for each part by weight of salicylanilide.

12. The process according to claim 1 wherein the surface active agent is cationic.

13. The process according to claim 12 wherein the surface active agent is an ethoxylated alkylamine having 1 to 18 carbon atoms in the alkyl chain.

14. The process according to claim 13 wherein the surface active agent is N,N-di(2-hydroxyethyl)fatty alkylamine having an average molecular weight in the approximate range 300 to 400.

15. The process according to claim 14 wherein the inert reaction medium is a mixture consisting essentially of:
 a. chlorobenzene, approximately 4 to 5 parts by weight;
 b. water, approximately 4 to 5 parts by weight; and
 c. N,N-di(2-hydroxyethyl)cocoamine having an average molecular weight of approximately 303, approximately 0.02 to 0.3 parts by weight
for each part by weight of salicylanilide.

* * * * *